United States Patent [19]
Pelto

[11] Patent Number: 4,809,507
[45] Date of Patent: Mar. 7, 1989

[54] ROTARY FLUID DEVICE

[76] Inventor: John H. Pelto, P.O. Box 11805, Tucson, Ariz. 85734-1805

[21] Appl. No.: 924,030

[22] Filed: Oct. 28, 1986

[51] Int. Cl.⁴ ............................................. F16D 31/02
[52] U.S. Cl. ........................................ 60/486; 60/484
[58] Field of Search .................................. 60/486, 484

[56] References Cited

U.S. PATENT DOCUMENTS 4,406,121 9/1983 Pelto ...................................... 60/330

Primary Examiner—William E. Wayner
Attorney, Agent, or Firm—Gregory J. Nelson

[57] ABSTRACT

A multiple stage rotary fluid device enclosed within a housing containing a working hydraulic fluid. An axially extending shaft is adapted to be secured to a source of power at one end. Fluid within the housing is directed across a control valve to an initial pump stage driven by the shaft. Pressurized fluid from the initial pump stage is directed to a hydraulic motor having a rotor which is rotatably driven through a planetary gear arrangement within an accentric housing. The pump housing surrounding the motor and pump is driven in a direction opposite that of the main shaft through a bevel gear arrangement driven from the axial shaft. Fluid is discharged through peripheral exhaust ports and the reservoir.

1 Claim, 5 Drawing Sheets

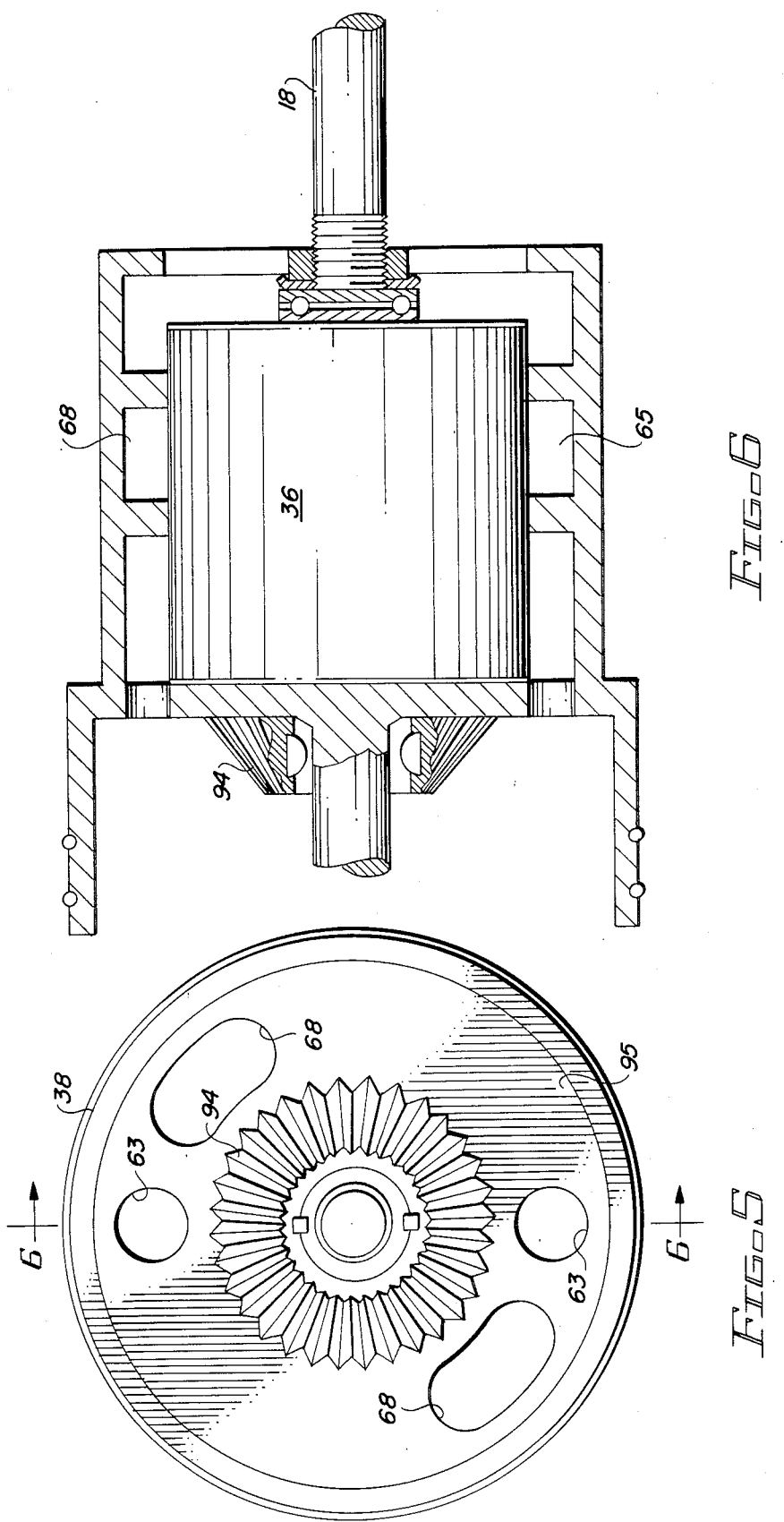

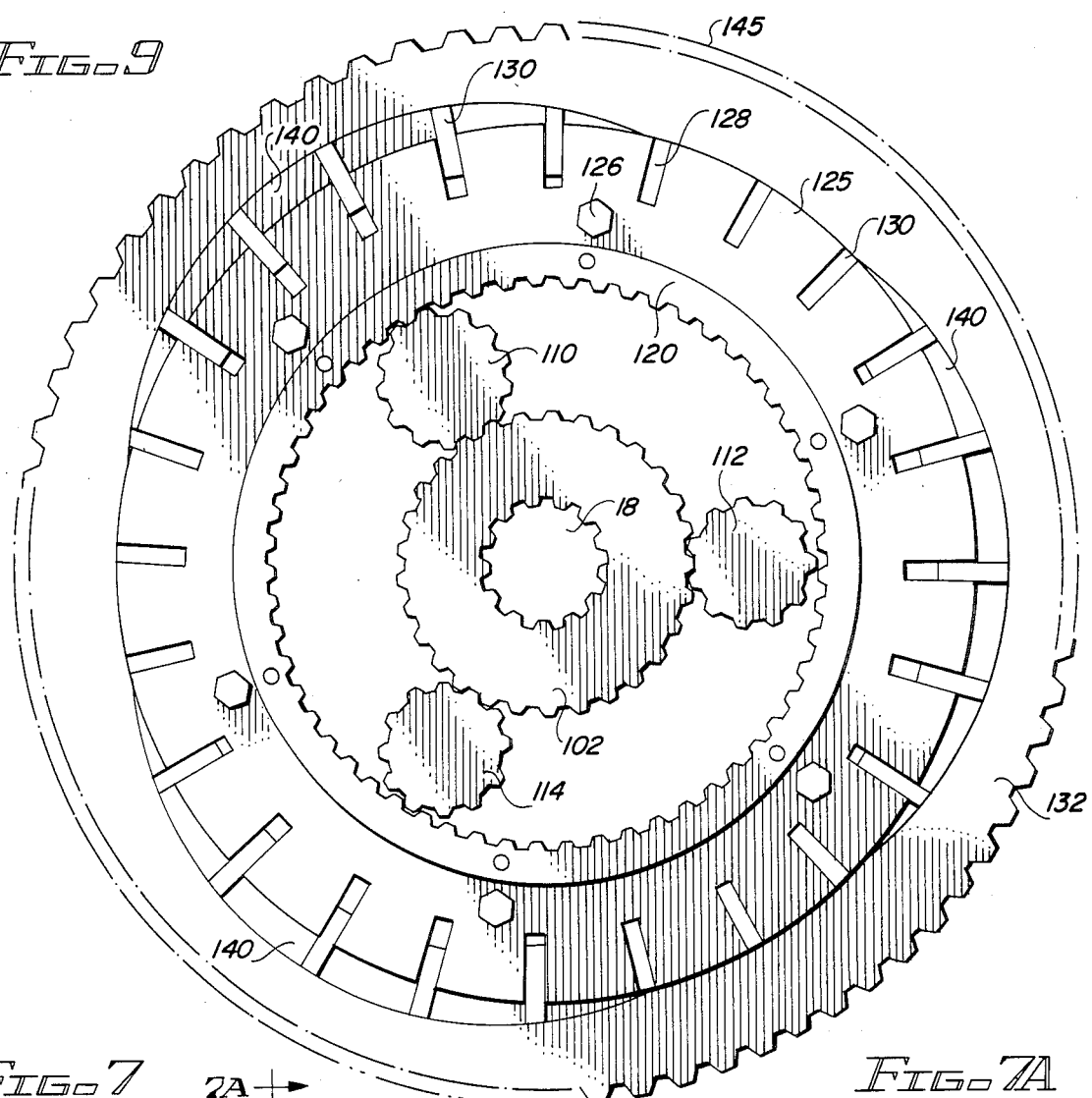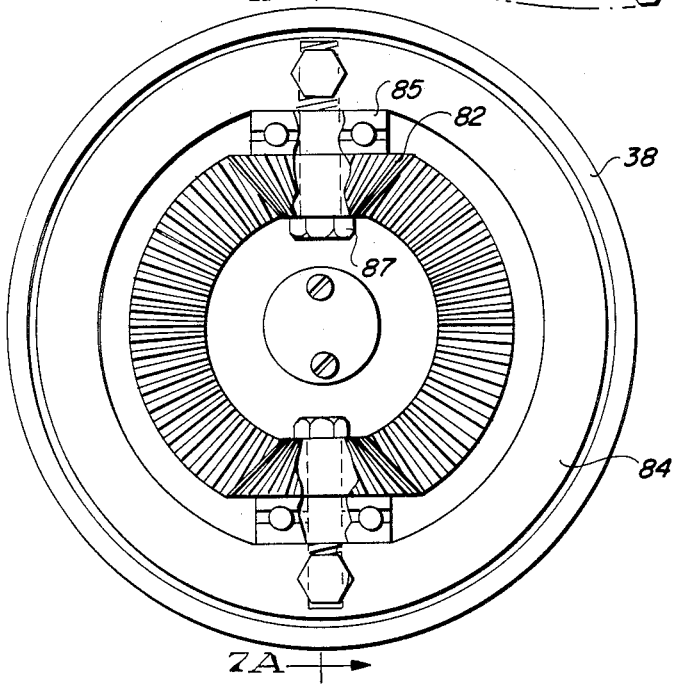

ROTARY FLUID DEVICE

The present invention relates to a rotary fluid device and more particularly to a multi-stage fluid pump and motor which may be operated as an energized hydraulic flywheel.

Flywheels generally consist of circular wheels or rims used in mechanical apparatus which, due to their inertia, moderate fluctuations of speed and torque at the output of the driven device. Rotary fluid devices generally have not performed well as flywheels because these devices increase the static pressure drag on the driving source and thus reduce the power output obtainable from the device. One particularly efficient rotary fluid flywheel device is described in my prior patent, U.S. Pat. No. 4,406,121 which discloses a multiple stage energized flywheel. My prior patent shows a device in which a shaft extends through the housing and fluid is introduced into the unit through a first stage axial flow section. Pressure increases are induced across a radial blower section and also in an annular squirrel cage section peripherally arranged about the radial blower. Pressurized fluid discharged from the squirrel cage sections is directed to either a peripheral exhaust ring which discharges pressurized fluid into the reservoir or to an adjacent hydraulic motor. The hydraulic motor includes a rotor which is secured to the stator section of the initial axial pumping section. The axial shaft, radial blower, squirrel cage and exhaust section rotate as a unit in one direction of operation. The hydraulic motor and axial pumping section and stator rotate as a unit in the opposite direction of rotation. The fluid device of my prior patent represents an advance in the state of the art as the device substantially reduces fluid frictional losses normally experienced in such devices.

The present invention provides further improvements in rotary fluid motors or pumps operable as flywheels. The present invention reduces static drag of the driving source and can be connected to any type of driving source such as an electric motor, internal combustion engine, steam or water driven apparatus or the like. The device of the present invention represents a design improvement over my prior patent and incorporates multiple pressure stages in sequence in a closed system in which the main shaft and hydraulic motor components operate in a first direction of operation and certain internal housing members rotate in an opposite direction of rotation within a fixed housing to reduce hydraulic drag.

Briefly, the present invention consists of a rotary fluid device enclosed within a fixed housing which defines a reservoir. An axially extending shaft is mounted in bearings in the housing and is adapted to be connected to an energy source at an appropriate clutch or coupling. Similarly, the output end of the shaft can be connected to some driven device at a clutch or coupling to perform useful work. Fluid is admitted from the reservoir into the intake of the device across appropriate control valve. The fluid from the intake is directed into an initial balanced vane pump section which is driven by the axial shaft. Pressurized fluid discharged from the pump section is directed to a hydraulic motor having a rotor which is rotatably driven through a planetary gear arrangement in an eccentric housing. The planetary gear assembly decreases the speed of the hydraulic motor. The pump housing surrounding the motor and pump is driven in a direction opposite that of the main shaft through a bevel gear arrangement driven from the axial shaft. Appropriate internal relief valves are associated with the unit. Fluid is discharged through peripheral exhaust ports to the reservoir.

The above and other objects of the present invention will be more fully appreciated from the following description, claims and drawings in which:

FIG. 5 is a sectional view taken along lines 5—5 of FIG. 1;

FIG. 6 is a sectional view taken along lines 6—6 of FIG. 5;

FIG. 7 is a sectional view taken along lines 7—7 of FIG. 1;

FIG. 7A is a sectional view taken along lines 7A—7A of FIG. 7;

FIG. 9 is a sectional view taken along lines 9—9 of FIG. 1; and

Figure 1:
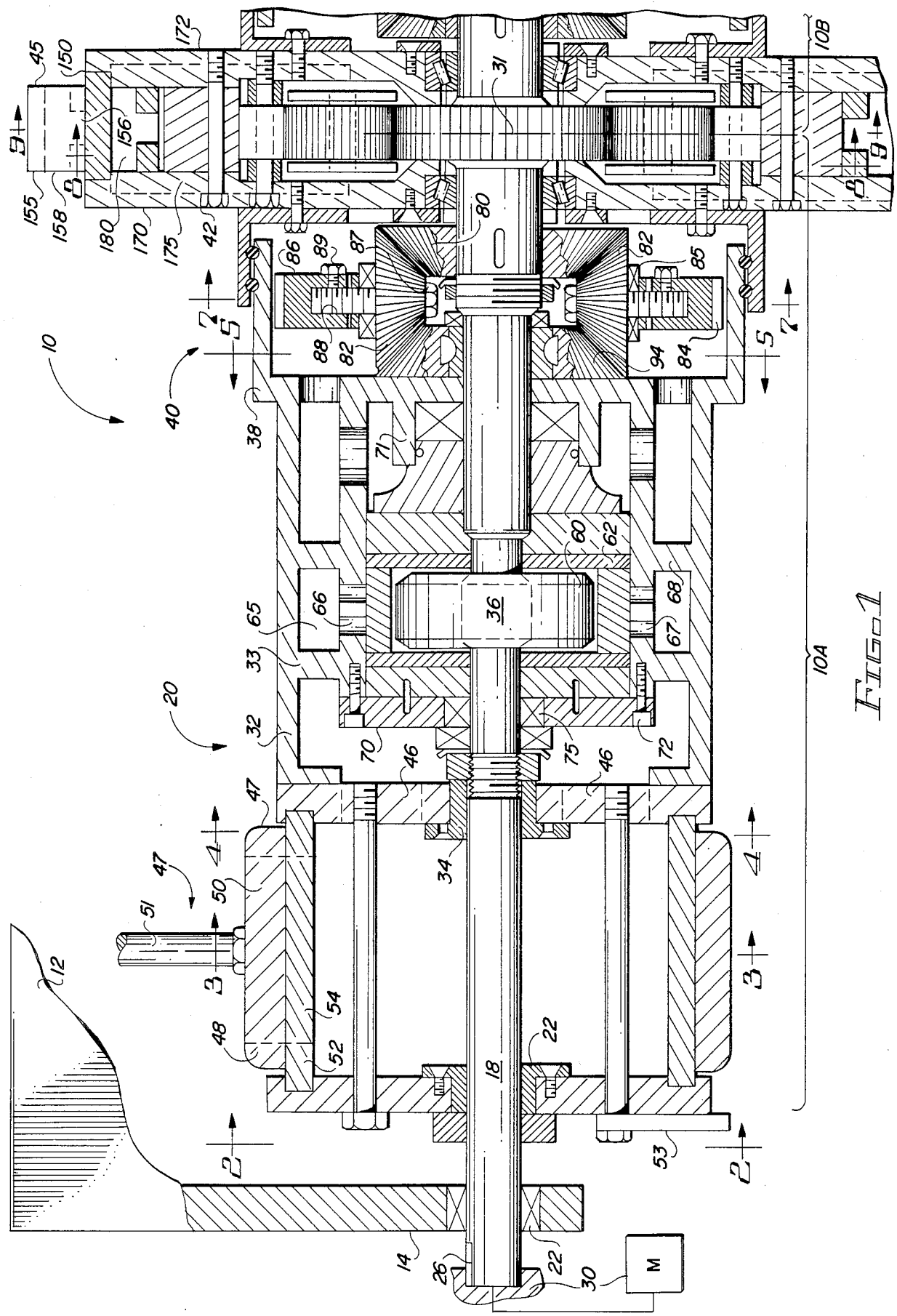
FIG. 1 is a longitudinal cross-section of the one half of the device of the present invention the other half being the mirror image thereof.
Figure 2:
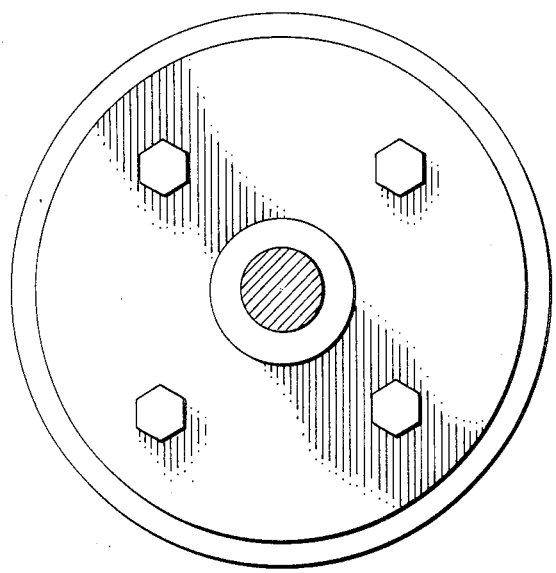
FIG. 2 is a end view taken along lines 2—2 of FIG. 1.
Figure 3:
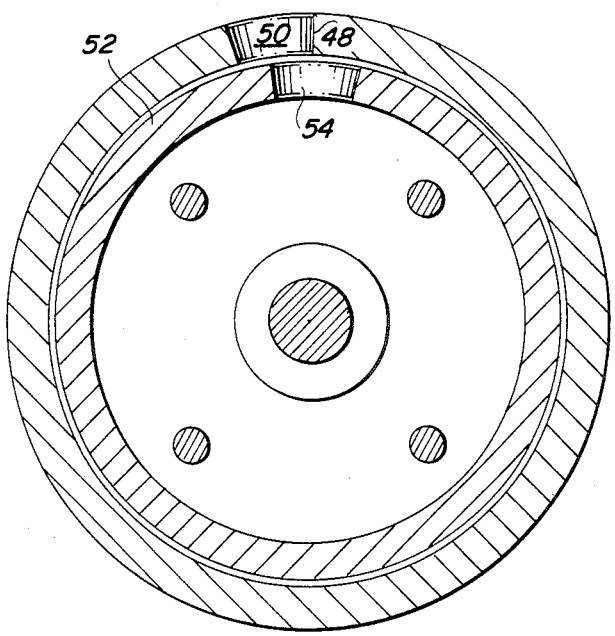
FIG. 3 is a sectional view taken along lines 3—3 of FIG. 1.
Figure 10:
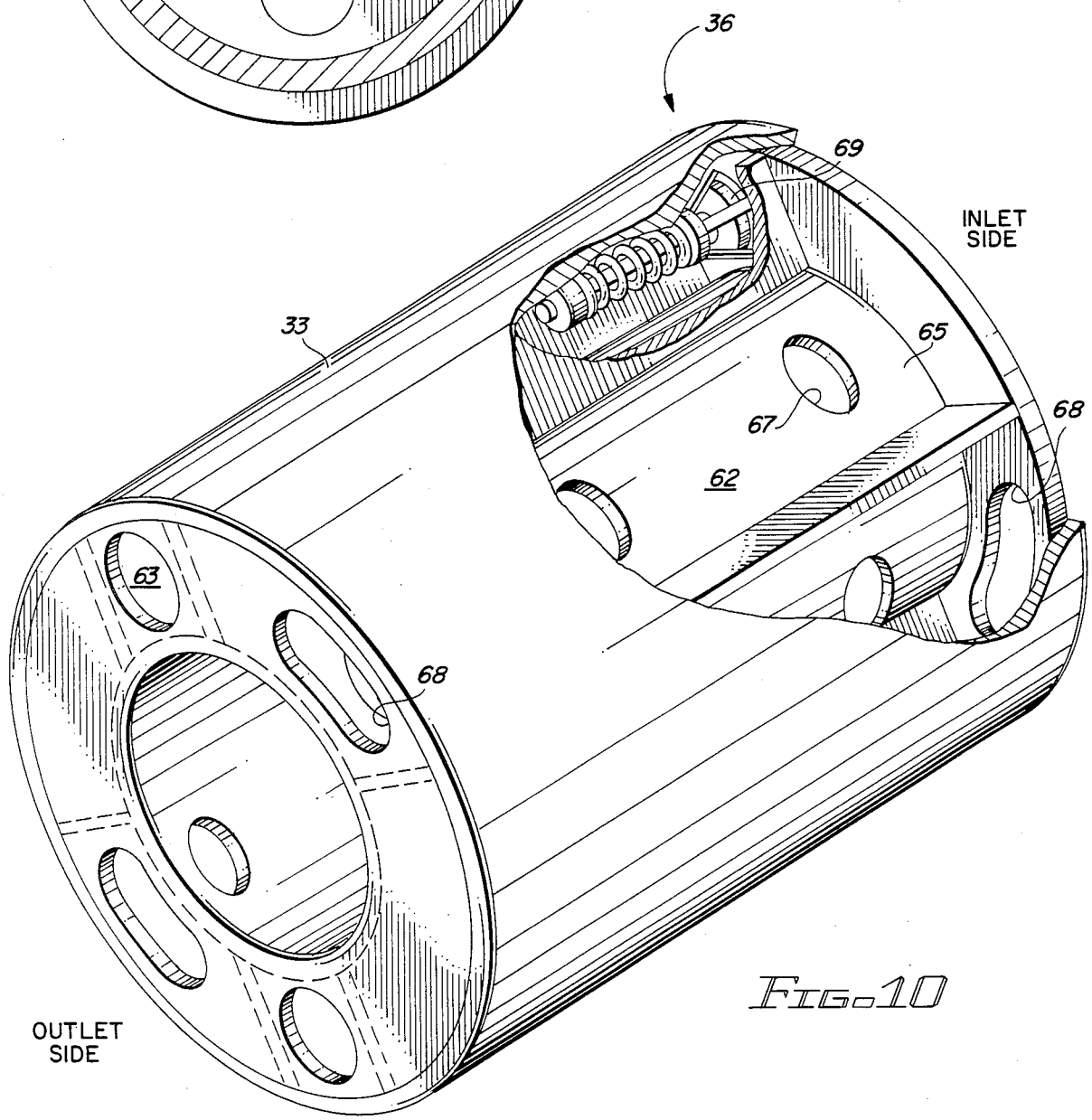
FIG. 10 is a perspective view, partly broken away, illustrating the inlet vane pump portion of the device of the present invention.

Turning now to the drawings, particularly FIGS. 1 and 10, the rotary device of the present invention is generally designated by the numeral 10 and includes a cylindrical housing 12 having opposite end walls 14. Housing 12 defines an interior chamber 20 which serves as a reservoir for a suitable fluid such as a hydraulic fluid. The cylindrical housing 12 entirely encloses the internal components but is shown broken-away in FIG. 1 for clarity of illustration.

Axial shaft 18 extends concentrically through housing 12 and is mounted for rotation in bearing assembly 22 secured at opposite end walls 14. Bearings 22 are preferably self-aligning anti-friction heavy duty bearings shown as being of the flange mounting type. Keyway 26 is provided at left end of shaft 18 to facilitate mechanically connecting the shaft to a coupling which, in turn, is in driven connection with a prime mover 30. Similarly, the opposite end of shaft 18 may be connected across a clutch or coupling to a device to perform useful work. The prime mover source may be any source of motive power such as electric, hydraulic or an internal combustion engine.

The apparatus 10 shown in the drawings comprises two sections 10A and 10B which are symmetrical with respect to centerline 31. Sections 10A and 10B are mirror images of one another and therefore detailed description of section 10A is believed sufficient, it being understood that this description applies to equally to section 10B. Similarly the unit is symmetrical with respect to the longitudinal axis of shaft 18.

Unit 10 is adapted to be driven from either end of axial shaft 18. Internal housing 32 is rotatably positioned in reservoir 20 on bearings 34 about shaft 18. Housing 32 includes an initial cylindrical section 33 which houses fluid pump 36. Intermediate cylindrical section 38 houses the reverse planetary gear arrangement 40 which will be described in greater detail hereafter. Central housing section 42 has a cylindrical outer surface which is rotatable in close tolerance to peripheral exhaust port arrangement 45 at the interior of the exterior housing 12. Central housing section 42 encloses the hydraulic drive motor and planetary gear arrangement as will be more fully set forth below.

Housing section 32 defines one or more generally circular inlet openings 46 in the end wall which communicate with reservoir 20 across inlet valve 47. The speed of the unit is regulated by valve 47 which regulates fluid flow to the unit. Valve 47 has an annular housing member 48 which defines radial port 50. Member 48 is rotatable with respect to annular member 52. Member 48 is adjustable by handle 51 which extends outside housing 12. Annular member 52 is fixed at bracket 53 and also defines a port 54 which when in registry with port 50 communicates the inlet 46 with reservoir 20. The relative position of ports 50 and 54 may be selectively opened and closed to regulate flow of hydraulic fluid to axial intake 46 opening at the end of the pump housing.

Housed within section 33 is hydraulic pump 36. Hydraulic pump 36 may be any type of conventional hydraulic pump but it is preferred that pumps of the type such as the Vickers Series 4535V and 4535VL balanced vane construction pump. Hydraulic pump 36, as illustrated in FIGS. 1, 6 and 10, includes a plurality of vanes 60 rotating within a housing 62. Inlet channels 65 in the housing 33 communicate the pump inlet ports 66 with fluid admitted to the interior of housing 32 across the inlet control valve. One or more radially extending exhaust ports 67 communicate pressurized fluid discharge from pump 36 with annular passageways 68 in housing section 32. Fluid passage 68 communicates with the interior 65 of housing section 36 across port 64. As seen in FIG. 10, appropriate pressure relief valves 69 are provided in axial passageway 63 to exhaust pressurized fluid to the inlet side of the pump when the discharge pressure exceeds a predetermined limit.

The housing of pump 36 is secured within section 32 by opposite mounting plates 70 and 71 which are formed as an integral part of the pump housing 32. Access to pump 36 is achieved by removing mounting plate 70 at appropriate mounting bolts 72. Housing section 32 also includes bearings 75 which are low friction bearings for supporting axially extending shaft 18.

Intermediate interior housing section 38 is cylindrical having a diameter slightly larger than the inlet or initial section 32. Intermediate section 38 houses a bevel gear arrangement which serves to drive the entire housing, including sections 32, 38 in a rotational direction opposite that of the direction of rotation of shaft 18. Section 38, as illustrated in FIGS. 6, 7, and 7A, includes a first bevel gear 80 secured to shaft 18. Gear 80 is directly driven from shaft 18 and, in turn, drives an opposed pair of idler bevel gears 82 which rotate about a vertical axis. Idler gears 82 are mounted on bearings 85 for rotation and secured to bracket 86 by bolts 87 which are received in threaded engagement in threaded bore 88 in the post. Thus, the vertical postion of the gears can be adjusted at bracket 86 and once fine adjustment is obtained, set screw 89 is locked in place. The opposite brackets 86 each terminate at a bushing 84 which, in operation, rotates relative to the interior of housing section 38. The idler gears 82 each engage bevel gear 94 which is secured to wall 71 of housing section 38. Accordingly, through this arrangement, the entire housing 14 along with inlet valve section 47 is rotated in a direction opposite the rotation of shaft 18.

Figure 8:
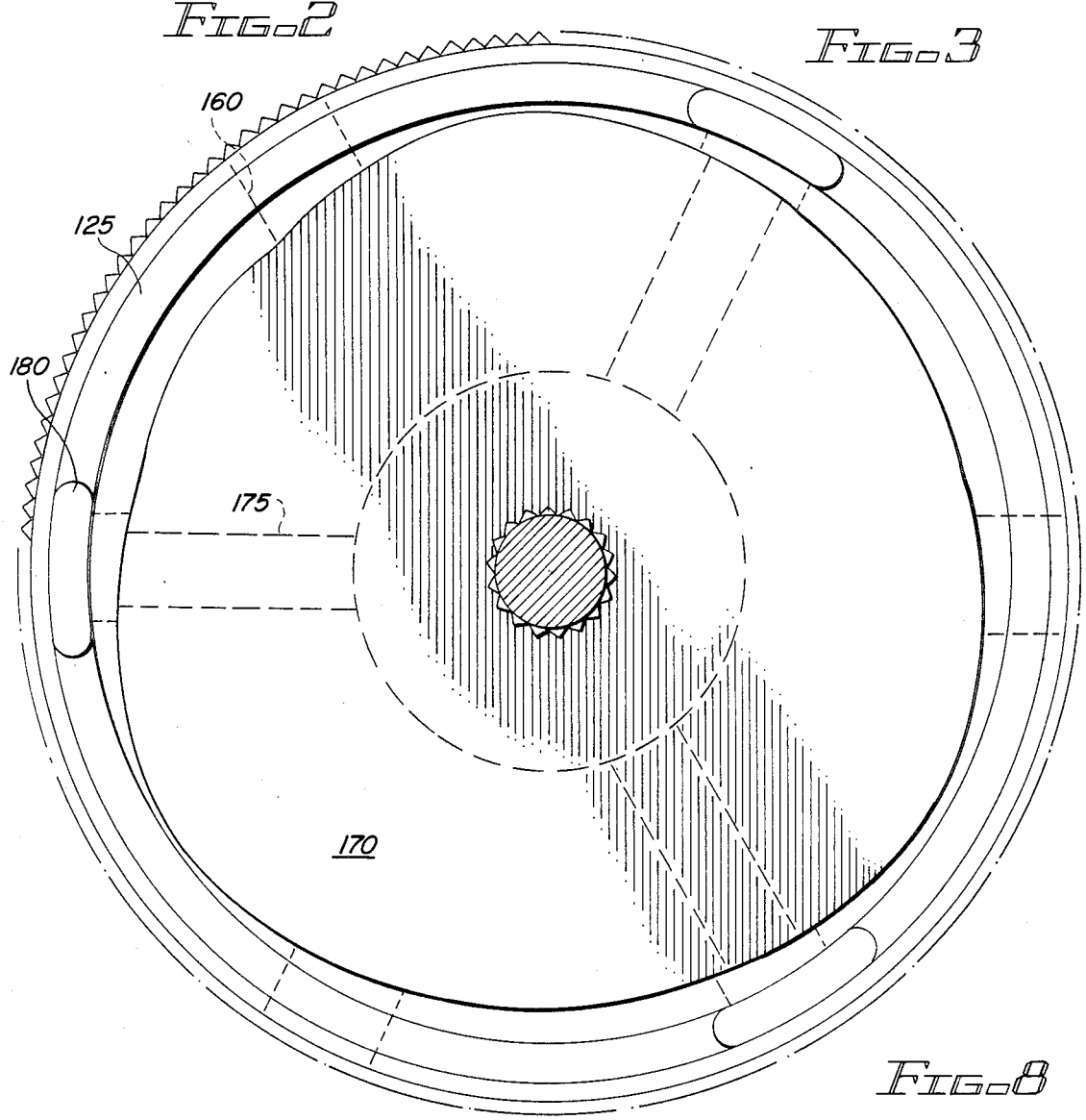
FIG. 8 is a sectional view taken along lines 8—8 of FIG. 1.
Figure 4:
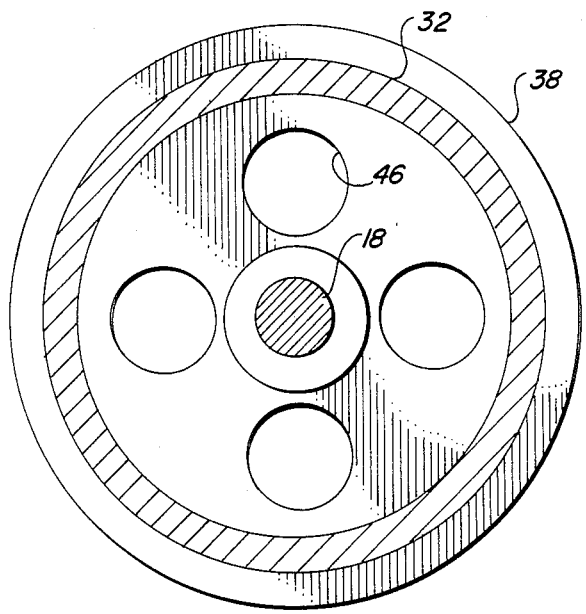
FIG. 4 is a sectional view taken along lines 4—4 of FIG. 1.

A hydraulic motor is centrally positioned located along the vertical centerline 31 of the unit and is best seen in FIGS. 1, 8 and 9. The hydraulic motor includes a main drive gear 102 which is splined to shaft 18. Gear 102 is in driving engagement with a plurality of planetary gears 110, 112 and 114. Planetary gears are in turn in engagement with ring gear 120. Ring gear 120 is secured to pump rotor 125 by bolts 126. The pump rotor 125 is provided with a series of radial recesses 128 which house radially slidable vanes 130 as is well known.

Pump rotor 125 is circular and is rotatable within eccentric member 132 which has a plurality of cavities 140 (three are shown) which form fluid chambers. As rotor 125 rotates relative to the eccentric, vanes 132 extend to engage the internal surface of cavities 140. Eccentric 130 and annular anchor ring 155 are secured to housing 12 and are fixed. Anchor ring 155 has a port 156 which communicates with the peripheral exhaust ports 160 in chambers 140 and discharges at 20 into reservoir 158.

The rotor and the pump member are enclosed by opposite side plates 170 and 172. The side plates define fluid passageways 175 which direct fluid from pump 36 to ports 180 which communicate the pressurized fluid to chambers 140. Fluid is exhausted from the chambers 140 at radially extending ports 160 which are positioned at the vertical centerline of the unit. Ports 160 communicate with annular passageway 158 within the anchor ring 155 via annularly extending slot 156. Thus, fluid exhausted from the motor chamber is directed to the reservoir through the passages in the anchor ring.

The apparatus of the present invention will be better understood from the following description of operation. The outer stationery housing is suitably secured or anchored to a foundation. The axial shaft is connected through a prime mover via a coupling. The opposite end of the shaft is connected to a device to perform useful work. The interior chamber of the housing is filled with a suitable fluid such as hydraulic fluid. Upon actuation of the prime mover, fluid is drawn into the hydraulic pump via the intake ports. The speed of the device is regulated by controlling the intake openings by means of inlet valve 47. Fluid introduced into the fluid motor via inport ports 46 is pressurized by means of the rotating pump member 36 and the pressurized fluid is discharged into flow passageway 68 in the pump section. The high pressure fluid is directed through the intermediate housing section 38 and into the hydraulic motor chambers 40 via inlet passageways 175. The hydraulic fluid impinges upon the vanes 130 of the rotor 125 and serves to impel the rotor in the direction of rotation of the vane shaft. Fluid is discharged at multiple peripheral locations from the pump chambers through ports 160 into the anchor ring 155 which is stationary. The anchor ring has radial ports 158 which discharge into the housing reservoir 20. The rotor is self-aligning due to the engagement of the rotor periphery with the cooperating gear teeth on the anchor ring. The interior housing 38 is driven simultaneously driven in a rotational direction opposite to that on the main shaft by means of the bevel gear arrangement which through bevel gears 80, idler gear2 82, and bevel gear 94 will cause the housing to rotate Energy which would be otherwise lost is conserved. The planetary gear assembly decreases the flywheel speed at a two-to-one ratio. This is necessary because the drag in fluid increases substantially above 500 to 700 r.p.m. The recommended pump rotor speed is 1200 r.p.m. and the recommended flywheel speed is approximately 600 r.p.m.

The forward rotation of the flywheel, shaft, spur gear and the reverse rotation of the pump housing are regulated so that they turn as a single unit.

The pressure relief valves 64 at the pump serve to regulate the fluid pressure and discharge excess pressure to the reservoir. It may be desireable to incorporate appropriate pressure monitoring equipment. For example, pressure within the flywheel can be monitored by a pressure line extending axially within the shaft 18 and communicating with passage 68. The end of the pressure tap can be connected to a suitable pressure transducer and electronically monitored externally of the unit.

The unit as constructed is provided with thrust bearings at all points of thrust drag. These are well known to those in the art. If necessary, an auxiliary external reservoir can be provided for cooling hydraulic fluid and then recirculated to the reservoir 20.

From the foregoing, it will be observed that fluid pressure is increased in the initial stages of the unit. The flywheel may be operated using any fluid medium such as air or hydraulic fluid. The device is also operable as a fluid or hydraulic motor or pump.

As pointed out above, I do not intend to limit my invention to the specific embodiment shown. For example, a number of pumping stages can be varied in accordance with the requirements of size and horsepower. Similarly, multiple units may be positioned in a balanced arrangement within a single enclosure on a single shaft.

It will be obvious to those skilled in the art to make various modifications and alterations to the device disclosed herein. To the extent that these changes, alterations and modifications do not depart from the spirit and scope of the appended claims, they are intended to be encompassed therein.

I claim:

1. A rotary fluid device comprising:
   (a) a main housing defining a chamber adapted to contain a working fluid;
   (b) an axially-extending shaft having opposite ends and extending through said housing and adapted to be connected to a prime mover at one end and adapted to be connected to perform work at the other end and operating in a first rotational direction;
   (c) a first section including:
      i. a first pressure stage having a rotor within a housing and connected for rotation with said shaft, said first pressure stage having a valved inlet for selectively communicating fluid from said housing chamber and an outlet for discharging pressurized fluid from said first pressure stage; and
      ii. gearing means driven by said shaft for rotating the housing from said first pressure stage in a second rotational direction.
   (d) gear means driven by said shaft;
   (e) a fluid motor having an eccentric driven by said gear means and defining fluid chambers in communication with said first pressure stage outlet and having pressure discharge into said main housing chamber;
   (f) a second section including:
      i. a first section including a first pressure stage having a rotary pump connected for rotation with said shaft, said first pressure stage having a valved inlet for selectively communicating fluid from said housing chamber and an outlet for discharging fluid pumped through said first pressure stage and operating in a second rotational direction; and
      ii. gearing means driven by said shaft for rotating the housing for said first pressure stage in a first rotational direction; and
   (g) said first and second sections being symmetrical with respect to said fluid motor with said first and second section disposed on either side thereof along said shaft.

* * * * *